United States Patent [19]

Bratt et al.

[11] Patent Number: 4,768,407

[45] Date of Patent: Sep. 6, 1988

[54] MARKING DEVICE

[75] Inventors: Sven A. Bratt, Tyresö; Gunnar C. Hansson, Stockholm, both of Sweden

[73] Assignee: Atlas Copco Aktiebolag, Nacka, Sweden

[21] Appl. No.: 856,584

[22] Filed: Apr. 25, 1986

[30] Foreign Application Priority Data

May 6, 1985 [SE] Sweden ............................... 8502203

[51] Int. Cl.[4] ........................ B25B 23/14; F16L 55/14

[52] U.S. Cl. .......................................... 81/467; 251/8; 81/468

[58] Field of Search ...................... 81/468, 467; 251/7, 251/8

[56] References Cited

U.S. PATENT DOCUMENTS 3,693,483 9/1972 Palmer et al. ......................... 81/468

4,548,382 10/1985 Otting .................................... 251/5

*Primary Examiner*—Frederick R. Schmidt

*Assistant Examiner*—Maurina Rachuba

*Attorney, Agent, or Firm*—Frishauf, Holtz, Goodman & Woodward

[57] ABSTRACT

A marking device for automatic marking of threaded joints tightened by a pneumatic power wrench, wherein a marking liquid container (48), a metering pump (37), a pressure air supply valve (31) and a marking liquid outlet passage (55) form a unit detachably clamped onto the power wrench housing (10). Pressure air communication passages (24, 25) feed the marking device directly with pressure air from the air supply passage (13) of the power wrench. The marking liquid container (48) comprises a replaceable collapsible tube which is pressurized all around in a pressure air supplied chamber (28). The single stroke metering pump (37) delivers for each stroke a well defined quantity of marking liquid to the outlet passage (55) which is formed by a fine hose made of plastic material with non-adhesive properties relative to the marking liquid. A pressure air operated feed valve (62) is arranged to prevent back flow and other uncontrolled flow of marking liquid through the outlet hose (55) by compressing the latter.

13 Claims, 2 Drawing Sheets

MARKING DEVICE

This invention relates to a marking device for identification of threaded joints tightened by a pneumatic power wrench.

In particular, the invention is intended to be used in connection with a pneumatic power wrench of the type having a housing, a motor drivingly connected to an output shaft, a pressure air supply passage and an automatic shut-off valve disposed within said air supply passage, and comprises a marking liquid container, a metering pump, an outlet passage means and a pressure air supply valve communicating with the metering pump as well as the shut-off valve.

Devices of the above type are previoüsly disclosed in U.S. Pat. Nos. 3,802,301 and 3,693,483. These and other prior art marking devices of the type using a liquid marking material do all suffer from problems relating to pumping and discharging the liquid, problems which mainly concern undesirable dripping of marking liquid due to poor operation of feed or check valves in the liquid discharge conduits. Another problem relates to unsatisfactory application of expelled marking liquid onto the threaded joint being tightened.

The invention intends to accomplish a marking device by which the above mentioned problems are avoided.

Other objects and advantages will appear from the following description and claims.

On the drawings

Figure 1:
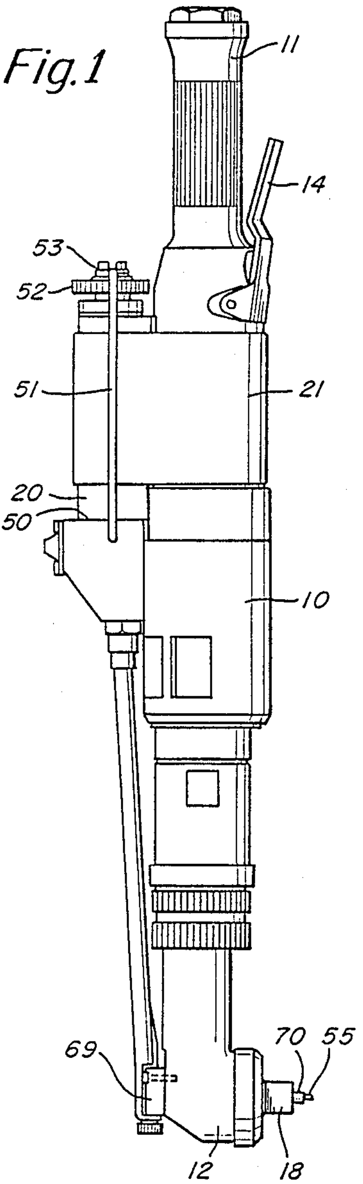
FIG. 1 shows a side view of a pneumatic power wrench provided with a marking device according to the invention.
Figure 2:
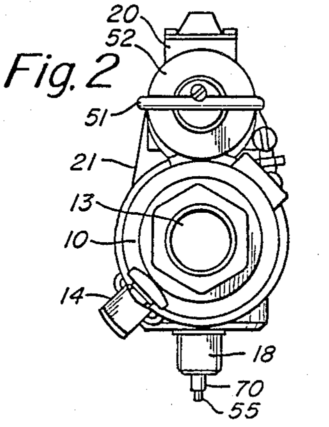
FIG. 2 shows a rear end view of the power wrench and marking device in FIG. 1.
Figure 5:
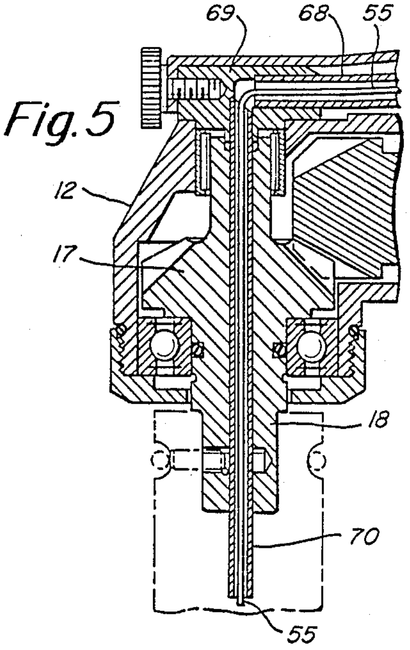
FIG. 5 shows a section through the angle head of the power wrench.

The marking device shown on the drawings is attached to a pneumatic power wrench comprising a housing 10 which is formed with a handle 11 at its rear end and an angle head 12 at its forward end. In the handle 11 there is a pressure air supply passage 13 (see FIGS. 2 and 3) through which pressure air is fed to a vane motor 15. In the air supply passage 13 there is a throttle valve (not shown) operable by a lever 14 and a shut-off valve 16 which is activated in a conventional manner in response to the desired final torque level being reached by the power wrench.

The mechanism in the power wrench by which the shut-off valve 16 is activated could be of any well known design and does not constitute any part of the invention. Therefore, the shut-off valve activation mechanism is not described in detail.

The vane motor 15 is drivingly connected to an output shaft 17 which is journalled in the angle head 12. The output shaft 17 is formed with a square drive end 18 for connection of a nut socket.

The marking device comprises a casing 20 which is firmly clamped onto the power wrench housing 10 by means of a steel band 21. The casing 20 is located relative to the wrench housing 10 by means of dowels 22, 23. Air communication passages 24, 25 extend between the wrench housing 10 and the marking device casing 20 and are sealed off by means of a resilient packing 26.

One of the air communication passages 25 interconnects via a restriction 27, a chamber 28 and passage 29 the air supply passage 13 downstream of the shut-off valve 16 and a first surface 30 of a diaphragm type air supply valve 31. Pressure air action on this first surface 30 loads the supply valve diaphragm 33 toward closed position. A spring biassed element 32 adds a biassing force on the valve diaphragm 33 in the same direction. The diaphragm 33 cooperates in its closed position with an annular seat 34 which defines a second smaller surface 35 on the opposite side of the diaphragm 33. This second surface 35 communicates through passage 24 with the air supply passage 13 upstream of the shut-off valve 16 and is pressurized as long as the throttle valve of the wrench is open.

A passage 36 extends from the air supply valve 31 to a single-stroke metering pump 37 for metering and delivering marking liquid. The pump 37 comprises a pump element 38 which is sealingly guided in a bore 39 in the casing 20 and which carries an air activated piston 40. The latter operates in a cylinder 41 which is closed by a stroke limiting end cover 42. A spring 43 serves to return the piston 40 and pump element 38 after each pump stroke. The end cover 42 limits the return stroke of the pump element 38 by forming an abutment means for the piston 40. The pump element 38 is formed with an extension 44 which extends out through the end cover 42, and a nut 45 on the pump element extension 44 serves as an adjustable pump stroke limitation means in that it abuts against the outside of end cover 42.

Marking liquid is supplied to the pump bore 39 through a passage 47 from a collapsible tube 48 threadingly received in a socket 49 in chamber 28. The tube 48 is enclosed in chamber 28 and is pressurized all around by pressure air from the air supply passage 13 in the power wrench downstream of the shut-off valve 16.

The marking liquid tube 48 is accessible for replacement by dividing the casing 20 along a transverse plane 50. A U-shaped tie rod 51 tensioned by a nut 52 threadingly engaging a rear extension 53 of the casing 20 serves to keep the latter firmly together in one piece.

A fine plastic hose 55 forms a continuous markig liquid delivery passage extending from the pump bore 39 to the outer end of the output shaft 17. The hose 55 is made of a synthetic resin such as polytetraflourethylene which has non-adhesive properties relative to the marking liquid. The internal diameter of the hose 55 is preferably in the size order of 1.0–2.0 mm.

The hose 55 is sealingly secured in the casing 20 adjacent the pump bore 39 by means of a nipple 56 which is axially clamped by a threaded plug 57 and a resilient bushing 58. The hose 55 extends through a chamber 60 which communicates with the pump piston cylinder 41 via a passage 61 and passes through a feed valve 62. The latter comprises a piston 63 (see FIGS. 3 and 4) loaded by a spring 59 and sealingly guided in a bore 64 and provided with an O-ring 67 for clamping engagement with the hose 55. The feed valve 62 also comprises a support element 65 against which the hose 55 is compressible by the piston 63 and O-ring 67. The support element 65 has a T-shaped air passage 66 (see FIG. 3) through which pressure air may pass the valve 62 but also reach the piston 63 for exerting a lifting force on the latter.

Figure 6:
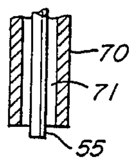
FIG. 6 shows, on a larger scale, a detail view as indicated in FIG. 5.

From the marking liquid feed valve 62 the hose 55 extends through a pasasge forming tube 68 which is sealingly connected to a cop cover 69 mounted on the angle head 12 of the power wrench. In this top cover 69 there is non-rotatively secured an air jet forming tube 70 which extends axially through the output shaft 17 in a coaxial relationship with the hose 55. The inner diameter of the tube 70 is adapted to the outer diameter of the hose 55 such that an annular air passage 71 is formed therebetween. See FIG. 6.

The operation order of the above described marking device is as follows:

When the power wrench is connected to a screw joint to be tightened via a nut socket attached to the square end 18 of the output shaft 17 and the desired final torque level has not yet been reached pressure air passes through the supply passage 13, past the shut-off valve 16 which is still open and into the vane motor 15. Simultaneously, the air pressure reaches the diaphragm 33 of the supply valve 31 both through passage 24 and passage 25, 27, 29. This means that the air supply valve 31 is kept closed, i.e. the diaphragm 33 continues to cooperate with seat 34, because the air activated surface 30 biassing the diaphragm 33 toward closed condition is larger than the surface 35 defined by seat 34.

Although at this stage the air supply valve 31 remains closed the chamber 28 is pressurized. This means that the marking liquid inside the collapsible tube 48 is pressurized too and that the supply of marking liquid to the pump bore 39 is ensured.

Figure 3:
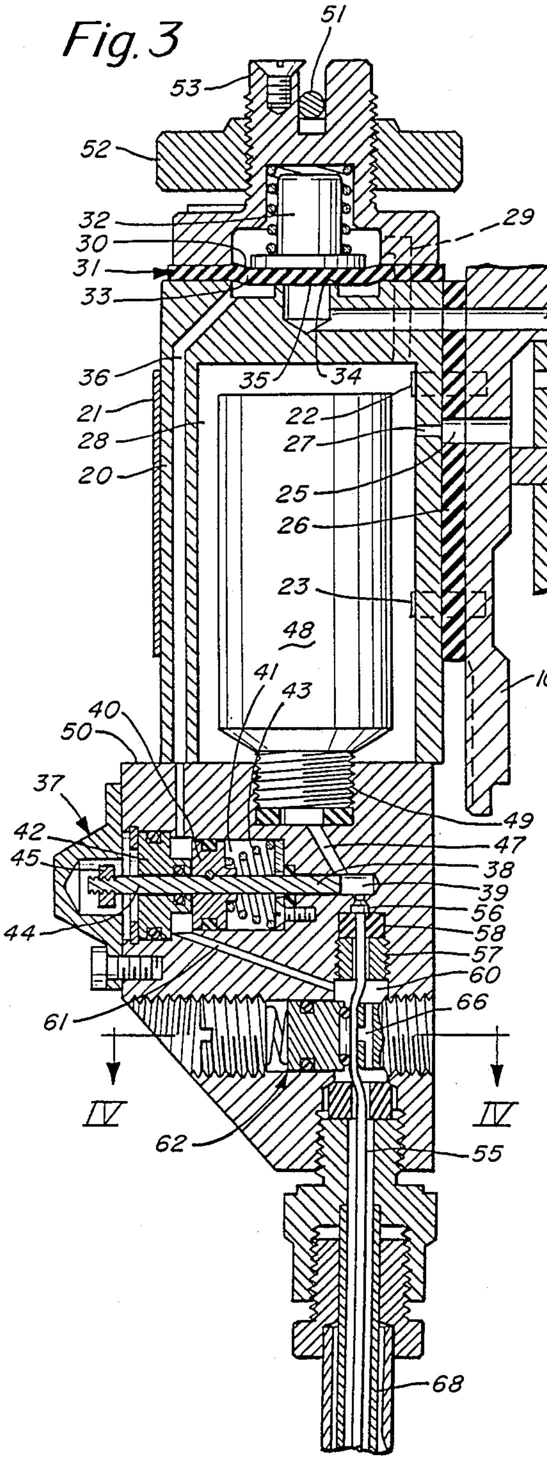
FIG. 3 shows a longitudinal section through a marking device according to the invention.
Figure 4:
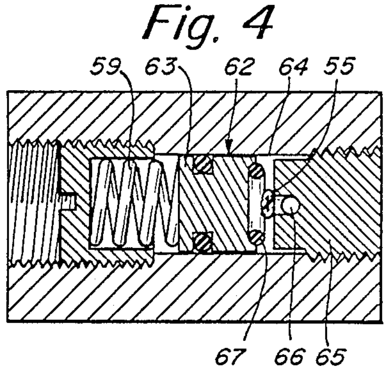
FIG. 4 shows a section through the marking liquid feed valve.

Since the air supply valve 31 is closed no pressure air is fed to the pump piston 40 and the feed valve 62. This means that the latter occupies its closed position, i.e. the position in which the hose 55 is compressed by the O-ring 64, and that the pump element 38 occupies its retracted rest position, as shown in FIG. 3.

As the desired final torque level in the joint is reached a release mechanism in the power wrench automatically shifts the shut-off valve 16 to closed position. Then the air pressure downstream of the shut-off valve 16 is discontinued as is the pressure in the passage 25. Instead, air is vented through the latter. Due to the restriction 27 the pressure within the chamber 28 and behind the diaphragm 33 drops slowly. However, the surfaces 30 and 35 of the valve diaphragm 33 as well as the bias force of the spring loaded element 32 are adapted in such a way that the valve 31 opens well before the pressure within chamber 28 has reached atmospheric pressure. As the valve 31 opens, pressure air is allowed to pass from the air supply passage 31 in the power wrench via passage 24 and seat 34 into passage 36 and cylinder 41. Piston 40 is pressurized and starts moving the pump element 38 on a pumping stroke against the action of spring 43.

During its pumping stroke the pump element 38 covers the marking liquid supply passage 47 and forces marking liquid out through the hose 55. Pressure air is simultaneously supplied to chamber 60 and via the T-shaped passage 66 to the lower end surface of piston 63 and exerting a lifting force on the latter. Assisted by the pump pressure in hose 55 the piston 63 is lifted from the support element 65 against the action of spring 59 to let marking liquid pass valve 62.

While the air supply valve 31 is open pressure air is continuously supplied to pump piston 40 and chamber 60. The pump element 38, though, perform just a single stroke and remains after that at the pump stroke end position. This position (not shown) as well as the length of the pump stroke is defined by the interengagement of nut 45 and the end cover 42. The quantity of marking liquid delivered at each pump stroke is determined by the product of the cross section of the pump element 38 and the length of the pump stroke.

The continuous supply of pressure air to chamber 60 during and shortly after each pump stroke generates an air flow through tubes 68 and 70. This air flow leaves the tube 70 at the outlet end of hose 55 and forms a tubular air jet around the latter the purpose of which is to carry the expelled marking liquid away from the end of hose 55 and onto the screw joint being tightened.

It is to be understood that at the beginning of the marking sequence described above the hose 55 is filled up with marking liquid all the way from the pump bore 39 down to the outlet end. Due to its very small internal diameter the hose 55 does not leak out any marking liquid between the marking sequences or screw joint tightening operations.

As the screw joint tightening process is completed the throttle valve (not shown) of the power wrench is closed, which results in the pressure air supply through passage 24 being interrupted. Then the valve 31 is reclosed by the action of spring biassed element 32, and the pump element 38 and the feed valve 62 are returned to their rest positions by the spring 43 and 59, respectively. This means that the hose 55 is blocked by compressing action of valve element 63 and O-ring 67 and the marking liquid within the hose 55 is prevented from being sucked back during the return stroke of pump element 38.

As the throttle valve is closed the pressure air force acting on the shut-off valve 16 is discontinued, which means that the latter is able to resume its normal opening position. At the same time the activating mechanism of the shut-off valve 16 is restored, and the power wrench as well as the marking device are ready for another tightening operation.

We claim:

1. An assembly for discharging a predetermined quantity of liquid in order to mark fasteners tightened by a pneumatic power wrench of the type having an air-operated motor drivingly connected to an output shaft, a pressurized supply pasasage, and an automatic shut-off valve means responsive to a preset torque level applied by the wrench and being disposed within said pasasge and having an open position to pass air flow to said motor and a closed position to block air flow to said motor, said assembly comprising:
   - a source of marking fluid;
   - a piston type metering pump having its input communicating with the source of marking fluid and having a displacement equal to said predetermined quantity of liquid;
   - a compressible discharge hose extending from the output of the metering pump to the forward extremity of the fastener-engaging output shaft of the power wrench;
   - a discharge valve including a clamping element movable between a discharge-hose-pinching position in which the discharge hose is closed and a lifted position in which the discharge hose is open;
   - a first pressurized-air-activated actuating means coupled to the metering pump for making the latter perform a working stroke;
   - a second pressurized-air-activated actuating means coupled to the clamping element of the discharge valve for shifting the clamping element from said discharge-hose-pinching position to said lifted position;

a control conduit communicating with said first and second actuating means; and a control means communicating with the automatic shut-off valve and with the control conduit for supplying pressurized air to said first and second actuating means via said control conduit as the automatic shut-off valve is closed, whereby a predetermined quantity of marking fluid is discharged onto a fastener.

2. The assembly of claim 1, wherein said control means comprises a control valve having its input communicating with said pressurized-air supply passage and its output communicating with said metering pump and feed valve.

3. The assembly of claim 2, wherein the metering pump and discharge valve have a control input, respectively, coupled to the output of said control valve.

4. The assembly of claim 2, wherein said control valve comprises an input, an output, and a control input, said output thereof being in communication with the control conduit, the input thereof being in communication with the pressurized-air supply passage, and the control input being in communication with a pressurized chamber, said assembly further comprising pressure control means for retaining said pressurized chamber at a pressure higher than said passage when the automatic shut-off valve is placed in its closed position.

5. The assembly of claim 4, wherein the control of the control valve input includes means responsive to pressure being higher in said pressurized chamber than in said passage for communicating the passage with said control conduit.

6. The assembly of claim 4, wherein the source of marking liquid is yieldable and is retained in said pressurized chamber which comprises an opening in a wall thereof for comunicating the source of marking liquid with said metering pump.

7. The assembly of claim 6, wherein said control means comprises a first bias means for exerting a bias force to return the metering pump to its initial condition after a working stroke and second bias means for exerting a force to move said clamping element from its lifted position to its discharge-hose-pinching position.

8. The assembly of claim 1, further comprising an air flow passage surrounding said compressible discharge hose and in communication with the pressurized-air supply passage.

9. The assembly of claim 8, wherein the air flow passage is in communication with the pressurized-air supply passage via the control valve and said control conduit.

10. The assembly of claim 1, wherein said control means activates the working stroke of the metering pump simultaneously with shifting the clamping element from its discharge-hose-pinching position to its lifted position.

11. The assembly of claim 10, wherein said control valve means, when activated, communicates pressurized air from said passage to the feed valve and the metering pump.

12. An assembly for discharging a predetermined quantity of liquid in order to mark fasteners tightened by a pneumatic power wrench of the type having an air-operated motor drivingly connected to an output shaft, a pressurized-air supply passage, and an automatic shut-off valve means responsive to a preset torque level applied by the wrench and being disposed within said passage and having an open position to pass air flow to said motor and a closed position to block air flow to said motor, said assembly comprising:

a container of marking liquid having at least one yieldable wall;

a discharge opening;

a metering pump having its input in communication with the container of marking liquid and including a chamber therein of a volume corresponding to the said predetermined quantity of liquid;

a feed valve having its input coupled to an output of the metering pump and its output coupled to the discharge opening;

a pressurized chamber enclosing said container and having a first passage in a wall thereof to sealably admit an opening of said container and for placing said marking liquid in communication with the metering pump, a second opening in a wall thereof, and a third opening in a wall thereof, the second opening communicating the pressurized chamber via the automatic shut-off valve with the pressurized-air supply passage;

a control valve means coupled to said third opening and said pressurized-air supply passage and being responsive to the actuation of said automatic shut-off valve to its second position and the consequent drop in pressure in the pressurized chamber for shifting said feed valve and metering pump from a condition blocking flow of marking liquid to the discharge opening to a condition permitting flow of marking liquid to the discharge opening.

13. The assembly of claim 12, further comprising an air flow restriction means in said second opening for restricting at least outward air flow from said pressurized chamber.

* * * * *